United States Patent
Bunker et al.

(10) Patent No.: US 11,118,997 B2
(45) Date of Patent: Sep. 14, 2021

(54) WATER LEAK DETECTION

(71) Applicant: Vivint, Inc., Provo, UT (US)

(72) Inventors: Brandon Bunker, Highland, UT (US); Thomas Colby Winegar, Draper, UT (US); Rongbin Lanny Lin, Orem, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/520,368

(22) Filed: Jul. 24, 2019

(65) Prior Publication Data
US 2020/0018664 A1 Jan. 16, 2020

Related U.S. Application Data

(63) Continuation of application No. 15/097,168, filed on Apr. 12, 2016.

(51) Int. Cl.
*G01M 3/26* (2006.01)

(52) U.S. Cl.
CPC ..................... *G01M 3/26* (2013.01)

(58) Field of Classification Search
CPC ............................. G01M 3/26; H04L 12/2816
See application file for complete search history.

(56) References Cited

U.S. PATENT DOCUMENTS

| | | | |
|---|---|---|---|
| 6,526,807 B1 | 3/2003 | Doumit et al. | |
| 7,920,983 B1 | 4/2011 | Peleg et al. | |
| 7,966,099 B2 | 6/2011 | Fima | |
| 8,413,204 B2 | 4/2013 | White et al. | |
| 8,606,413 B2 | 12/2013 | Picton | |
| 8,667,978 B2 | 3/2014 | Ford | |
| 2010/0313958 A1* | 12/2010 | Patel | G01F 1/34 137/1 |
| 2011/0050395 A1* | 3/2011 | Ervin | G01M 3/26 340/6.11 |
| 2013/0321637 A1* | 12/2013 | Frank | H04N 5/2257 348/152 |
| 2013/0335218 A1* | 12/2013 | Jones | G08B 21/20 340/539.1 |
| 2014/0026644 A1* | 1/2014 | Patel | G01M 3/2807 73/40 |
| 2014/0238511 A1* | 8/2014 | Klicpera | G08B 21/18 137/551 |
| 2017/0030528 A1* | 2/2017 | Dietzen | G08B 21/20 |
| 2017/0089798 A1* | 3/2017 | Di | G01M 3/18 |
| 2017/0324577 A1* | 11/2017 | Warren | H04L 12/6418 |

\* cited by examiner

*Primary Examiner* — Peter Bradford
(74) *Attorney, Agent, or Firm* — Holland & Hart, LLP

(57) ABSTRACT

Systems and methods for detecting water leaks using a security and/or automation system includes receiving total water usage data for a home, receiving water usage data for known sources in the home, receiving occupancy data for at least one occupant in the home, and determining a water leak based at least in part on the total water usage data, water usage data for known sources, and occupancy data.

20 Claims, 9 Drawing Sheets

WATER LEAK DETECTION

CROSS REFERENCE

The present application us a continuation of U.S. patent application Ser. No. 15/097,168, filed Apr. 12, 2016, and titled "WATER LEAK DETECTION", which is assigned to the assignee hereof. The disclosure of this reference is incorporated herein in its entirety by this reference.

BACKGROUND

The present disclosure, for example, relates to security and/or automation systems, and more particularly to water leak detection using aspects of security and/or automation systems.

Security and automation systems are widely deployed to provide various types of communication and functional features such as monitoring, communication, notification, and/or others. These systems may be capable of supporting communication with a user through a communication connection or a system management action.

Early detection of water leaks and associated water damage can save money for homeowners and insurance agencies. In current systems, leak detection is performed using a liquid detection sensors at every location where a homeowner would like to detect leaks. Liquid detection sensors are typically positioned outside of plumbing pipes at locations where leaked liquids may collect. It is usually difficult to position sensors at every possible location where leaks could occur since at least some types of leaks may occur underground or within walls or other spaces in a home that cannot be accessed without significant damage and/or cost.

SUMMARY

The present disclosure is directed to systems and methods for water leak detection. Various systems and methods may be used to detect whole water usage. This whole home water usage information may be combined with information about occupancy in the home and operation of certain appliances as part of determining a potential water leak. Whole home water usage may be determined by, for example, receiving meter information from a water utility company, operating a flow device that is placed in the water main, or operating a pressure sampling device that is placed into a free spigot or water outlet of the home. Occupancy may be determined in a number of ways including, for example, operation of a home security system (e.g., entering an "arm" or "disarm" setting), detecting opening or closing of exterior doors, detecting operation of certain appliances such as a television or kitchen appliance, etc. Once occupancy is confirmed, other criteria may be used to determine if the occupants are in a sleep state or would otherwise not be using water. A sleep state may be determined by, for example, the home securing system being set to a "stay" or "armed" mode, user input to a home automation and/or security system confirming a sleep mode, a sensor in the occupants bed indicating physical location, a predetermined time when the user is typically determined to not use water (e.g., 12:00 a.m. to 6:00 a.m.), motion detection, cameras, etc.

Another aspect of the present disclosure relates to disaggregation of known water usage at various times. For example, a toilet, shower, or sink typically would not run when the home is vacant, but other appliances such as a dishwasher, washing machine, ice machine, humidifier, or sprinkler system may operate when the home is vacant (e.g., based on timers or delays). By removing the known water usage from the total water usage of the home, it may be possible to identify a potential leak. Once a leak is detected, a notice may be sent to the homeowner. In some examples, the notice and/or other operations related to the leak detection system may be generated using a home security and/or automation system, which may include at least a control panel located in the home.

In one embodiment, a method for detecting water leaks using a security and/or automation system includes receiving total water usage data for a home, receiving water usage data for known sources in the home, receiving occupancy data for at least one occupant in the home, and determining a water leak based at least in part on the total water usage data, water usage data for known sources, and occupancy data.

In one example, receiving total water usage data may include at least one of receiving water usage data from a water utility company, receiving water usage data from a flow meter located in a water main of the home, and receiving water pressure data from a pressure sampling device placed in a free spigot or water outlet of the home. Receiving water usage data for known sources may include receiving sensor data associated with use of at least one of a dishwashing machine, a clothes washing machine, a humidifier, an ice machine, and a sprinkler system. Receiving water usage data for known sources may include determining an amount of water used by at least one of a dishwasher, a clothes washing machine, a humidifier, an ice machine, and a sprinkler system. Receiving occupancy data may include receiving at least one of detected operation of a setting of the security and/or automation system, detected operation of a door of the home, detected operation of an appliance in the home, detected operation of a lock of the home, detected use of a furniture item of the home, or detected motion in the home. Determining the water leak may include disaggregating water usage based at least in part on the known sources of water usage and occupancy. Disaggregating may include determining usage of water sources that should not occur when no occupants are present in the home. Receiving occupancy data may include receiving occupancy data when the at least one occupant is in bed.

Another embodiment is directed to an apparatus for security and/or automation systems. The apparatus includes a processor, memory in electronic communication with the processor, and instructions stored in the memory. The instructions are executable by the processor to determine total water usage for a home from a first water usage input, determine water usage for known sources in the home from at least one second water usage input, determine occupancy of at least one occupant in the home using occupancy data, and determine a water leak based at least in part on the total water usage, water usage data for known sources, and occupancy.

In one example, determining total water usage data may include at least one of receiving water usage data from a water utility company, receiving water usage data from a flow meter located in a water main for the home, and receiving water pressure data from a pressure sampling device placed in a free spigot or water outlet of the home. Determining water usage data for known sources may include receiving sensor data associated with use of at least one of a dishwasher, a clothes washing machine, a humidifier, an ice machine, and a sprinkler system. Determining water usage data for known sources may include determining an amount of water used by at least one of a dishwasher, a clothes washing machine, a humidifier, an ice machine, and a sprinkler system. Determining occupancy may include receiving at least one of detected operation of a setting of the security and/or automation system, detected operation of a door of the home, detected operation of an appliance in the home, detected operation of a lock of the home, detected use of a furniture item of the home, and detected motion in the home. Determining a water leak may include disaggregating water usage based at least in part on the known sources of water usage and occupancy. Disaggregating may include determining usage of water sources that should not occur when no occupants are present in the home. Receiving occupancy data may include receiving occupancy data when the at least one occupant is in bed.

A further embodiment is directed to a non-transitory computer-readable medium storing computer-executable code for security and/or automation systems. The code is executable by a processor to determine total water usage for a home, determine occupancy for the home, and determine a water leak based at least in part on the total water usage and occupancy.

In one example, the code is executable by a processor to determine water usage data for known sources in the home, wherein determining the water leak is based at least in part on the determined water usage data for known sources. Determining water usage data for known sources in the home may include at least one of receiving sensor data associated with use of at least one known source in the home, and determining an amount of water used by at least one known source in the home. Determining total water usage may include at least one of receiving water usage data from a water utility company, receiving water usage data from a flow meter located in a water main for the home, and receiving water pressure data from a pressure sampling device placed in a free spigot or water outlet of the home.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Water leaks can be difficult to detect in certain residential and commercial settings. Many types of water leak detection systems require significant costs and time associated with retrofitting existing plumbing and the addition of costly meters, sensors, and control systems. In some cases, water leaks are particularly difficult to detect when the metering of water usage and historical water usage data is under the control of a utility company rather than the property owner. Furthermore, many existing water leak detection solutions that utilize water leak sensors can only detect water leaks in the specific location where the sensor is present. The present disclosure provides improved water leak detection that in many cases avoids retrofitting existing plumbing and placement of sensors in difficult to access areas. The present disclosure may also provide increased certainty in determining a water leak using a reduced number of components (e.g., meters, sensors, etc.) as compared to other leak detection systems. In some embodiments, the present systems and methods may cooperate with features and functionality of an existing security and/or automation system.

In one embodiment of the present disclosure, a leak detection system obtains water usage information for an entire home (or other property). The system may also determine water usage information for all known sources of water usage in the home, and determines occupancy of people in the home. Some water usage associated with the home are dependent on occupancy (e.g., toilets, sinks, showers, etc.), while other water usage is independent of occupancy (e.g., appliances/systems that can be programmed to operate on a delay/timer). The system may take into consideration all of the collected information about water usage and occupancy and determine whether and/or where a water leak exists. The system may notify the home owner, user, or third party (e.g., a security and/or automation system operator) of the potential water leak.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
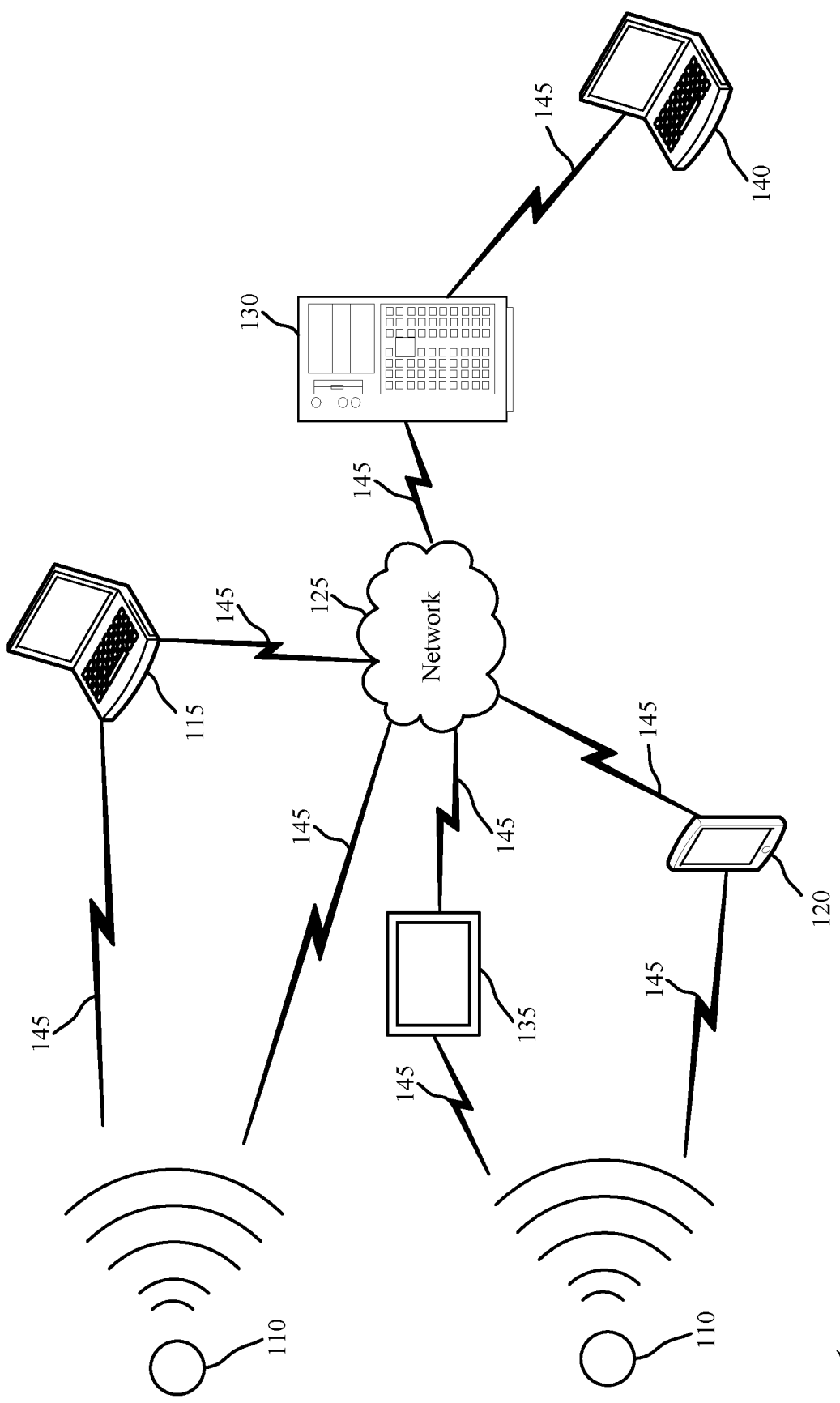
FIG. 1 is a block diagram of an example of a security and/or automation system with water leak detection capability, in accordance with various embodiments.

FIG. 1 is an example of a communications system 100 in accordance with various aspects of the disclosed leak detection systems and related methods. In some embodiments, the communications system 100 may include one or more sensor units 110, local computing device 115, 120, network 125, server 130, control panel 135, and remote computing device 140. One or more sensor units 110, which may include various water usage and/or occupancy-related sensors, may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required.

Local computing device 115, 120 and remote computing device 140 may be custom computing entities configured to interact with sensor units 110 via network 125, and in some embodiments, via server 130. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125. For example, control panel 135 may receive water usage information for the home from a plurality of sensor units 110 located through the home, and/or may receive water usage information for the home from a remote source such as a utility company via network 125. Control panel 135 may, in at least some embodiments, provide at least some of the data storage, processing, and other capabilities otherwise provided by local computing devices 115, 120 and/or remote computing devices 140.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EE-PROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to water usage, leak detection, occupancy and/or user behavior. Each sensor unit 110 may be capable of sensing multiple parameters, or alternatively, separate sensor units 110 may monitor separate parameters. For example, one sensor unit 110 may measure total water usage for a home, while another sensor unit 110 (or, in some embodiments, the same sensor unit 110) may detect water usage by individual water usage sources in the home (e.g., faucets, appliances, sprinkler systems, etc.). In some embodiments, one or more sensor units 110 may additionally monitor alternate occupancy-related parameters, such as motion detection, locking/unlocking of doors and/or windows, usage of appliances, or the like. Sensor units 110 may monitor a variety of user activities, such as determining whether the user is sleeping, participating in a certain activity, or located in a certain room for a period of time, or determining a pattern of behavior that in some way helps determine when water usage occurs and/or how much water usage occurs at certain times of day (e.g., morning or evening) or related to certain activities (e.g., showering, running a dishwasher, operating a clothes washer, or operating a sprinkler system, and the like). In alternative embodiments, a user may input water usage and/or occupancy-related data directly at the local computing device 115, 120, at control panel 135, or at remote computing device 140. For example, a user may enter water usage or occupancy-related data into a dedicated application on his smart phone indicating what water usage activity is planned/completed, or when the user is leaving the home or returning home.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or smart phone. Where local computing device 115, 120 is a smart phone, the smart phone may have a dedicated application directed to collecting water usage and/or occupancy-related data and calculating potential water leaks therefrom. The local computing device 115, 120 may process the data received from the one or more sensor units 110 to obtain information that may be relevant to determining a water leak. In alternate embodiments, remote computing device 140 may process the data received from the one or more sensor units 110, via network 125 and server 130, to obtain information relevant to a water leak determination. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the sensor units 110 or local computing devices 115, 120, or may simply forward the received information to the remote computing device 140 and control panel 135.

Server 130 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 130 may receive a stream of water usage data from a sensor unit 110 or metering device, a stream of occupancy-related data from the same or a different sensor unit 110, and a stream of user behavior-related data from either the same or yet another sensor unit 110. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing water usage and/or occupancy-related data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with resource usage data.

Figure 2:
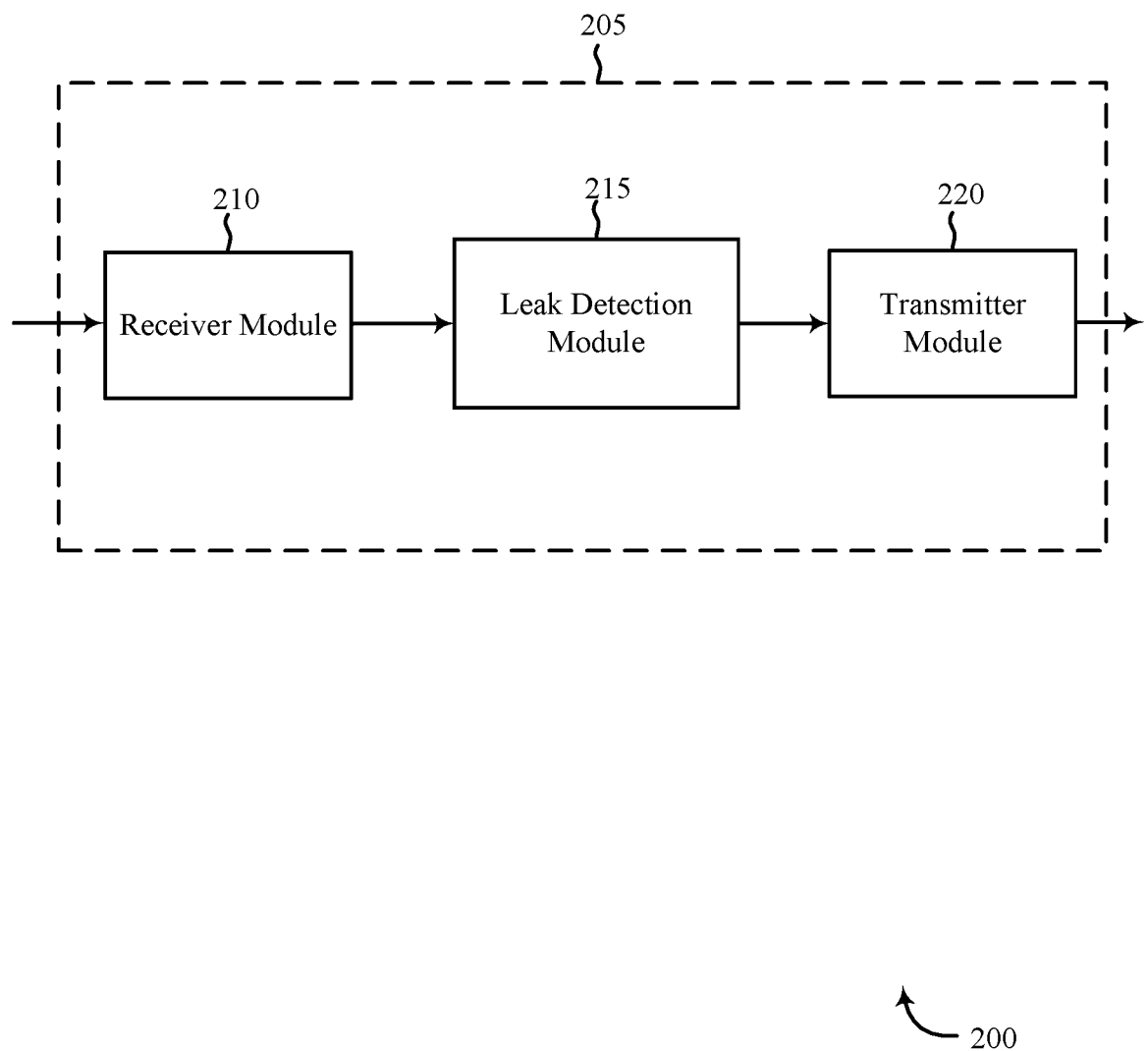
FIG. 2 shows a block diagram of a device relating to a security and/or an automation system with water leak detection capability, in accordance with various aspects of this disclosure.

FIG. 2 shows a block diagram 200 of a device 205, which may be one example of local computing device 115, 120 or remote computing device 140, for use in electronic communication, in accordance with various aspects of this disclosure. In one example, device 205 is an example of a control panel 135 of a security and/or automation system illustrated in FIG. 1. The device 205 may include a receiver module 210, a leak detection module 215, and/or a transmitter module 220. The device 205 may also be or include a processor. Each of these modules may be in communication with each other—directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive water usage and/or occupancy-related data from one or more sources. Information may be passed on to the leak detection module 215, and to other components of the device 205.

The leak detection module 215 may receive information accredited by receiver module 210 as part of determining a water leak in a home. The information received from receiver module 210 may include, for example, total water usage data for the home, water usage by specific sources in the home, and/or occupancy related data. The leak detection module 215 may determine with some level of accuracy what specific sources of water usage in the home should or should not be using water based on, for example, whether the user is at home and/or whether an at home user is in bed (i.e., asleep and not using water) or involved in a particular activity. The leak detection module 215 may disaggregate the known sources of water usage from the total water usage as part of determining whether a water leak exists. Further details concerning operation of the leak detection module 215 are described below with reference to FIGS. 3-6.

The transmitter module 220 may transmit the one or more signals received from other components of the device 205. The transmitter module 220 may transmit various types of information, such as notices to a home owner or third party concerning a water leak or potential water leak condition in the home. In some embodiments, transmitter module 220 transmits other types of information, such as data collected from one or more sensors, user feedback, user instructions, or the like. In some examples, transmitter module 220 may be collocated with the receiver module 210 in a transceiver module.

Figure 3:
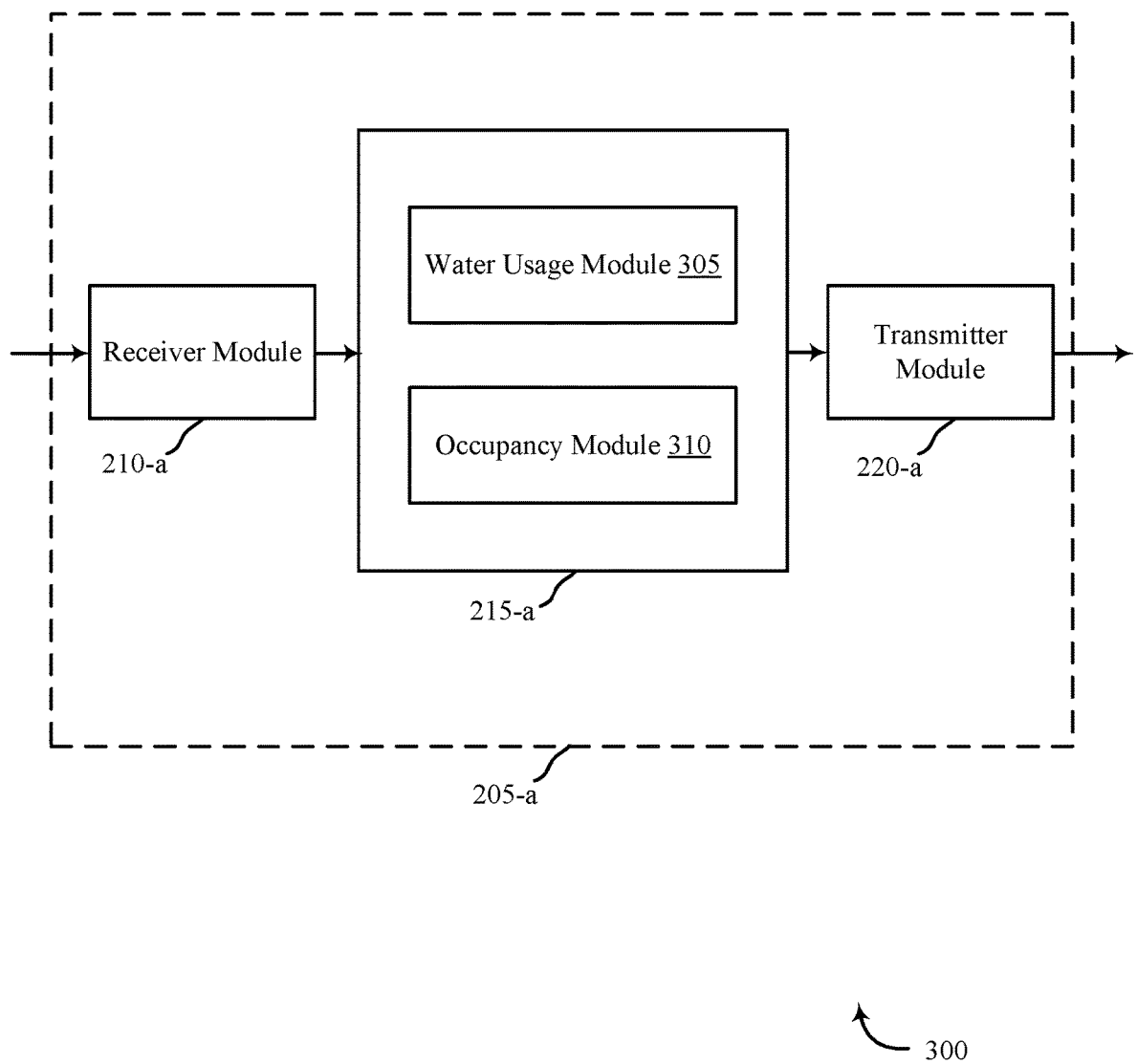
FIG. 3 shows a block diagram of a device relating to a security and/or an automation system with water leak detection capability, in accordance with various aspects of this disclosure.

FIG. 3 shows a block diagram 300 of a device 205-*a* for use in wireless communication, in accordance with various examples. The device 205-*a* may be an example of a device 205 described with reference to FIG. 2. The device 205-*a* may include a receiver module 210-*a*, a leak detection module 215-*a*, and/or a transmitter module 220-*a*, which may be examples of the corresponding modules of device 205. The device 205-*a* may also include a processor. Each of these components may be in communication with each other. The leak detection module 215-*a* may include a water usage module 305 and an occupancy module 310. The receiver module 210-*a* and the transmitter module 220-*a* may perform the functions of the receiver module 210 and the transmitter module 220, of FIG. 2, respectively.

The components of the device 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The water usage module 305 may operate to determine various water usage information for a home. For example, the water usage module 305 may receive information regarding total water usage for the home. The source for the total water usage may include, for example, data and/or reports provided by a utility company. In some examples, the utility company may stream real-time water usage data to water usage module 305. In other examples, a sensor, a camera, or the device may be associated with the utilities water metering device for the home, and may operate to determine water usage based on a reading of the utilities metering device. In the example of a camera, the camera may obtain digital images or video footage of the metering device and use character recognition or other software to determine water usage by reading the metering device. In other examples, the utility's water metering device may transmit water usage information through wired or wireless communication mediums (e.g., digital and/or analog) to water usage module 305.

In another example, the home owner may provide their own water metering device in a water main of the home. The water metering device may be placed in the water main by disassembling a joint or coupling of a water main and/or cutting into the water main in order to gain access to the flow channel of the water main where the metering device is positioned. The cost, time and complexity associated with installing a separate water metering device in the water main may be cost-prohibitive in some scenarios.

Another way to obtain total water usage for the home may be to monitor pressure in the water lines of the home. At least one pressure device may be mounted to a free spigot, tap, or other access point of the water system for the home. The pressure device monitors pressure drops, which are typically associated with water usage. The amount of pressure drop and the duration at which the pressure drop is maintained may be correlated with an amount of water being used. In at least some examples, the real-time pressure drops monitored by the pressure device may on occasion be compared to actual water usage data provided by, for example, the utility company to "learn" or calibrate the pressure device to more closely and accurately assess the amount of water used for given types of pressure drops and durations associated with the pressure drops. In other examples, a pressure device may be mounted internal one or more water lines of the home, such as with a metering device that is positioned in a water main of the home.

The water usage module 305 may also operate to determine specific and/or known uses of water, also referred to as known water usage sources, in the home. At least some water usage sources in a home may use a specific amount of water and/or use water for a specific period of time. For example, a dishwasher may use 3 gallons of water in each of its wash and rinse cycles, which cycles are typically spaced apart by approximately 15 minutes. A toilet flush may use 1.5 gallons in a 30 second period. A washing machine cycle may use 3-5 gallons of water in each of its wash and rinse cycles, which may be separated by 30-40 minutes. A lawn sprinkler system may operate constantly for 2 hours at a rate of 5 gallons per minute. Other water use sources in a home may be less predictable in both volume and duration. For example, the shower may operate at a rate of 3-5 gallons per minute, but may vary in length from 3 minutes to 10 minutes. Operating a water tap when brushing teeth or manually washing dishes, and other water use activities may also vary significantly depending on the user, time of day, time of year, etc.

The water usage module 305 may be able to determine which of the various water use sources may operate when users are home versus when the users are determined to have left home and/or are in a sleep state. Various appliances may be operable on time delays, which results in operation of the appliance when users are not home and/or are asleep. However, other types of water usage can only occur when a person is home (e.g., operate a shower, flush a toilet, operate a faucet, etc.) Other appliances may run on time delays such as, for example, dishwashers, clothes washers, sprinkler systems, humidifiers, ice machines, and the like.

The occupancy module 310 may operate to determine whether users are in the home. The occupancy module 310 may determine when specific users are in the home. The occupancy module 310 may operate to determine particular behaviors and/or activities performed by users when they are home. For example, occupancy module 310 may determine when a user is in an active state moving around, in an inactive state sitting or performing a certain task (e.g., operating a computer), sleeping or at least positioned in bed, in the vicinity of the home but not in the home (e.g., doing yard work), and the like.

Occupancy may be determined with the occupancy module 310 in a number of ways. Occupancy module 310 may receive data from a plurality of sensors, any of which alone or in combination may help determine occupancy and/or behavior of occupants. For example, occupancy module 310 may receive data from a motion sensor that is triggered when a person is moving within the home, which indicates occupancy. Occupancy module 310 may receive data from a door lock sensor, a door open sensor, a window open sensor, a sensor that tracks manual adjustments to appliances or systems such as an HVAC system, lighting, video cameras, or the like. In one example, occupancy module 310 may determine that a person has left the home when one sensor indicates that the back door has opened and closed followed by opening and closing of the garage door. In another example, the occupancy module 310 may determine departure of all users when a security system has been armed, when all exterior doors have been locked, particularly at a certain time of day (e.g., in the morning hours), or if a geo sensor carried by the user (e.g., a security card or fob) indicates that none of the users are within a certain geographic boundary of the home. Any one or a combination of these various sensor data may be used by occupancy module 310 to determine that one or more of the users have left the home. Similar data may be used to determine when one or more users has returned to the home.

When occupancy module 310 determines one or more users is home, occupancy module 310 may receive further data and/or information that indicate certain behavior of one or more users in the home. For example, occupancy module 310 may receive data from one or more kitchen appliances that indicate that a user is in the kitchen cooking. The occupancy module 310 may receive sensor data from one or more users' beds that indicate that someone is in a specific bed. The data from the bed may, in combination with the time of day (e.g., after 10:00 p.m.) and settings of the HVAC system and/or security system, may provide a high probability that the person is asleep, and therefore less likely to consume any additional water from appliances that are unable to run on time delay.

Given the determined behavior of the user, the leak detection module 215-a may be able to limit some of the possible uses of water that can be subtracted from the total water usage (e.g., disaggregation) as part of determining whether water is being used by an unknown source. Unknown sources of water usage may indicate a leak. Since leaks are typically consistent and/or ongoing over an extended period of time, both the water usage determined by water usage module 305 and occupancy and/or user behavior as determined by occupancy module 310 may be used to determine over extended periods of time (e.g., days and/or weeks) whether there is ongoing water usage from an unknown source.

Furthermore, leak detection module 215-a may operate using feedback and/or data provided by water usage module 305 and occupancy module 310 to determine whether there is unexpected water usage even while the user is home. For example, water usage from an interior faucet and/or tap for a period of time longer than would be normal for filling a bathtub or taking a shower may prompt generation of a notification to the user of such unexpected water usage. This reminder to the user may be helpful in the event the user unintentionally left water running. In an example of determining unexpected water usage while a user is away from home, a known day, time and duration for operating a sprinkler system may be compared to actual usage and duration, which may not match. Leak detection module 215-a may provide a notification to the user (e.g., the transmitter module 220-a) that the sprinkler system is operating improperly. A similar scenario may be applied to other types of water usage sources in the home.

The leak detection module may operate based on raw data provided by sensors, metering devices, controllers, and the like, and make its own determination of input needed for determining a leak. For example, leak detection module 215-a may receive raw data from a water pressure device and/or main water line metering device, and from that sensor data determine total water usage for the home. In another example, the data received from the pressure device or water metering device may be the actual total water usage for the home provided in a format that can immediately be used without further processing by leak detection module 215-a. The leak detection module 215-a may simply receive data that is then used to determine a potential water leak, or determine the information needed to determine a potential leak based on raw data provided by one or more other sources.

Figure 4:
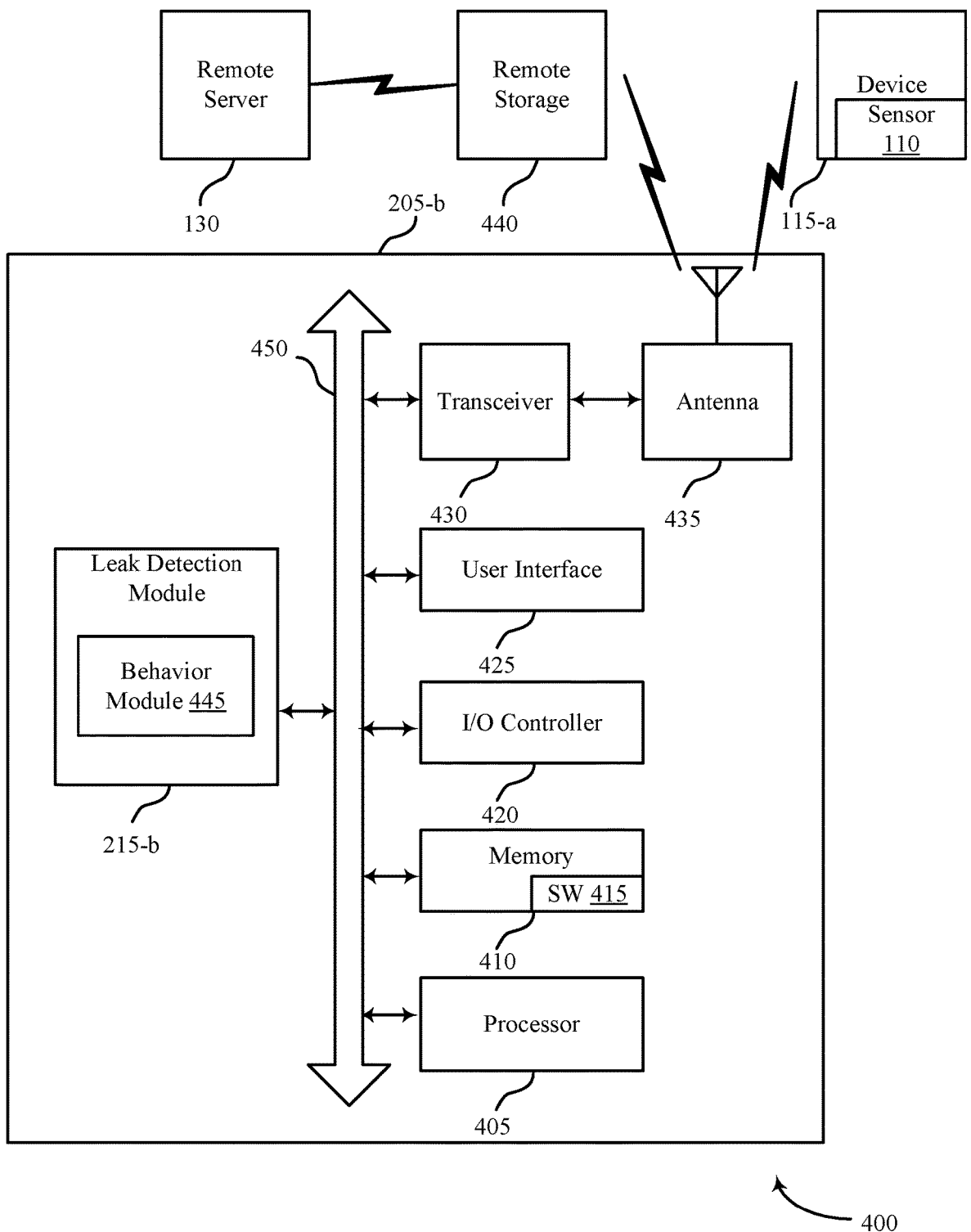
FIG. 4 shows a block diagram relating to a security and/or an automation system with water leak detection capability, in accordance with various aspects of this disclosure.

FIG. 4 shows a system 400 for use in leak detection systems, in accordance with various examples. System 400 may include a device 205-b, which may be an example of the control panels 135 of FIG. 1. Device 205-b may also be an example of one or more aspects of devices 205 and/or 205-a of FIGS. 2 and 3.

Device 205-b may also include components for bi-directional voice and data communications including components for transmitting communications and components for receiving communications. For example, device 205-b may communicate bi-directionally with one or more of devices 115-a, one or more sensors 110, remote storage 440, and/or remote server 130. This bi-directional communication may be direct (e.g., device 205-b communicating directly with remote storage 440) or indirect (e.g., device 205-b communicating indirectly with remote server 130 through remote storage 440).

Device 205-b may also include a processor module 405, and memory 410 (including software (SW) 415), an input/output controller module 420, a user interface module 425, a transceiver module 430, and one or more antennas 435 each of which may communicate—directly or indirectly—with one another (e.g., via one or more buses 450). The transceiver module 430 may communicate bi-directionally—via the one or more antennas 435, wired links, and/or wireless links—with one or more networks or remote devices as described above. For example, the transceiver module 430 may communicate bi-directionally with one or more of devices 115-a, remote storage 440, sensor 110, and/or remote server 130. The transceiver module 430 may include a modem to modulate the packets and provide the modulated packets to the one or more antennas 435 for transmission, and to demodulate packets received from the one or more antenna 435. While a control panel or a control device (e.g., device 205-b) may include a single antenna 435, the control panel or the control device may also have multiple antennas 435 capable of concurrently transmitting or receiving multiple wired and/or wireless transmissions. In some embodiments, one element of device 205-b (e.g., one or more antennas 435, transceiver module 430, etc.) may provide a direct connection to a remote server 130 via a direct network link to the Internet via a POP (point of presence). In some embodiments, one element of device 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 110 (e.g., motion, proximity sensor, smoke, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 450 may allow data communication between one or more elements of device 205-b (e.g., processor module 405, memory 410, I/O controller module 420, user interface module 425, etc.).

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices. For example, the leak detection module 215-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

The memory 410 may include random access memory (RAM) and read-only memory (ROM). The memory 410 may store computer-readable, computer-executable software/firmware code 415 containing instructions that are configured to, when executed, cause the processor module 405 to perform various functions described herein (e.g., collect and/or determine total water usage for a home, collect and/or determine known sources of water usage in the home, determine occupancy of a home, determine a water leak, etc.). Alternatively, the computer-readable, computer-executable software/firmware code 415 may not be directly executable by the processor module 405 but may be configured to cause a computer (e.g., when compiled and executed) to perform functions described herein.

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the device 205-b may include a single antenna 435, the device 205-b may have multiple antennas 435 capable of concurrently transmitting and/or receiving multiple wireless transmissions.

The device 205-b may include a leak detection module 215-b, which may perform the functions described above for the leak detection modules 215 of device 205 of FIGS. 2 and 3. The leak detection module 215-b may include a behavior module 445, in addition to or in place of the water usage module 305 and occupancy module 310 of the leak detection module 215-a of FIG. 3.

The leak detection module 215-b shown in FIG. 4 may include a behavior module 445. Behavior module 445 may operate independently of the water usage module 305 and occupancy module 310 described above with reference to FIG. 3. Behavior module 445 may operate as a sub-module of occupancy module 310. Behavior module 445 may operate to determine certain behaviors of one or more users of the home. The behavior information may then be used to determine what water usage is unlikely or likely to occur within certain timeframes. Behavior module 445 may identify certain patterns of behavior over a time. For example, behavior module 445 may determine over time that all users of the home have departed the home by 8:00 a.m. every Monday through Friday, begin returning home at 3:00 p.m. on days Monday through Friday, and go to bed between the hours of 11:00 p.m. and 12:00 a.m. every day of the week. Behavior module 445 may also determine patterns of behavior associated with water usage such as, for example, number of toilet flushes per day, length of showers, number of clothes washing machine cycles per week, number of lawn sprinkler cycles per week and the like. These patterns of behavior and associated water usage may be beneficial as part of disaggregating known water usage from the total water usage for the home as part of determining a potential water leak.

The leak detection module 215-b shown in FIG. 4 may include other modules such as, for example, the water usage module 305 and occupancy module 310 shown in FIG. 3, or other modules such as the receiver module 210 and transmitter module 220 shown in FIGS. 2 and 3. Other modules may be possible to perform specific tasks such as, for example, the disaggregation discussed above, the determination of specific amounts of water for operation of known water sources (e.g., clothes washing machines, dishwashers, showers, ice machines, etc.). In another example, the leak detection module 215-b may include a notification module that generates notices, alarms or the like in association with a potential water leak and sends the same to a remote location and/or a mobile device.

Figure 5:
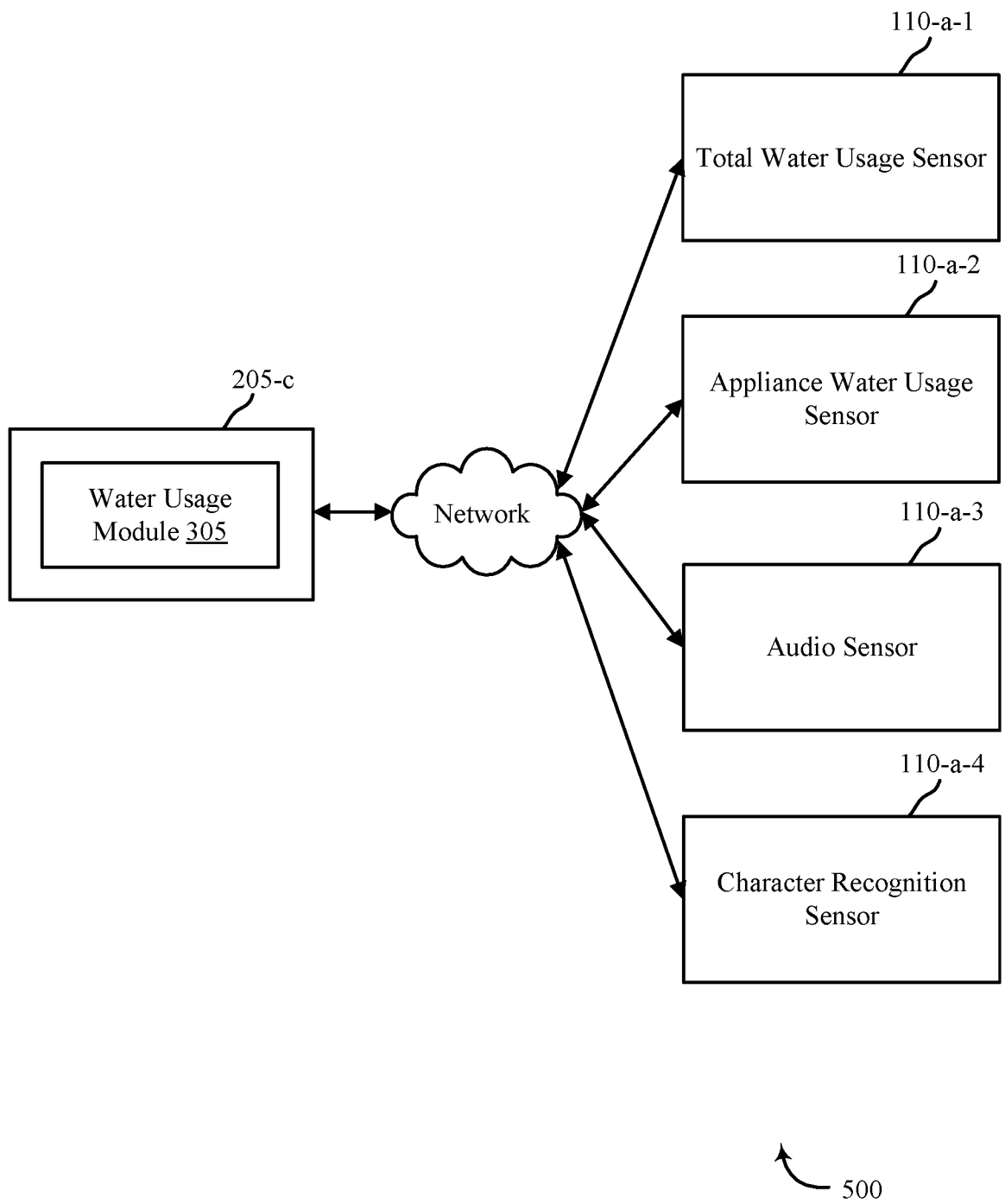
FIG. 5 shows a block diagram of an apparatus relating to a security and/or an automation system with water leak detection capability, in accordance with various aspects of this disclosure.
Figure 6:
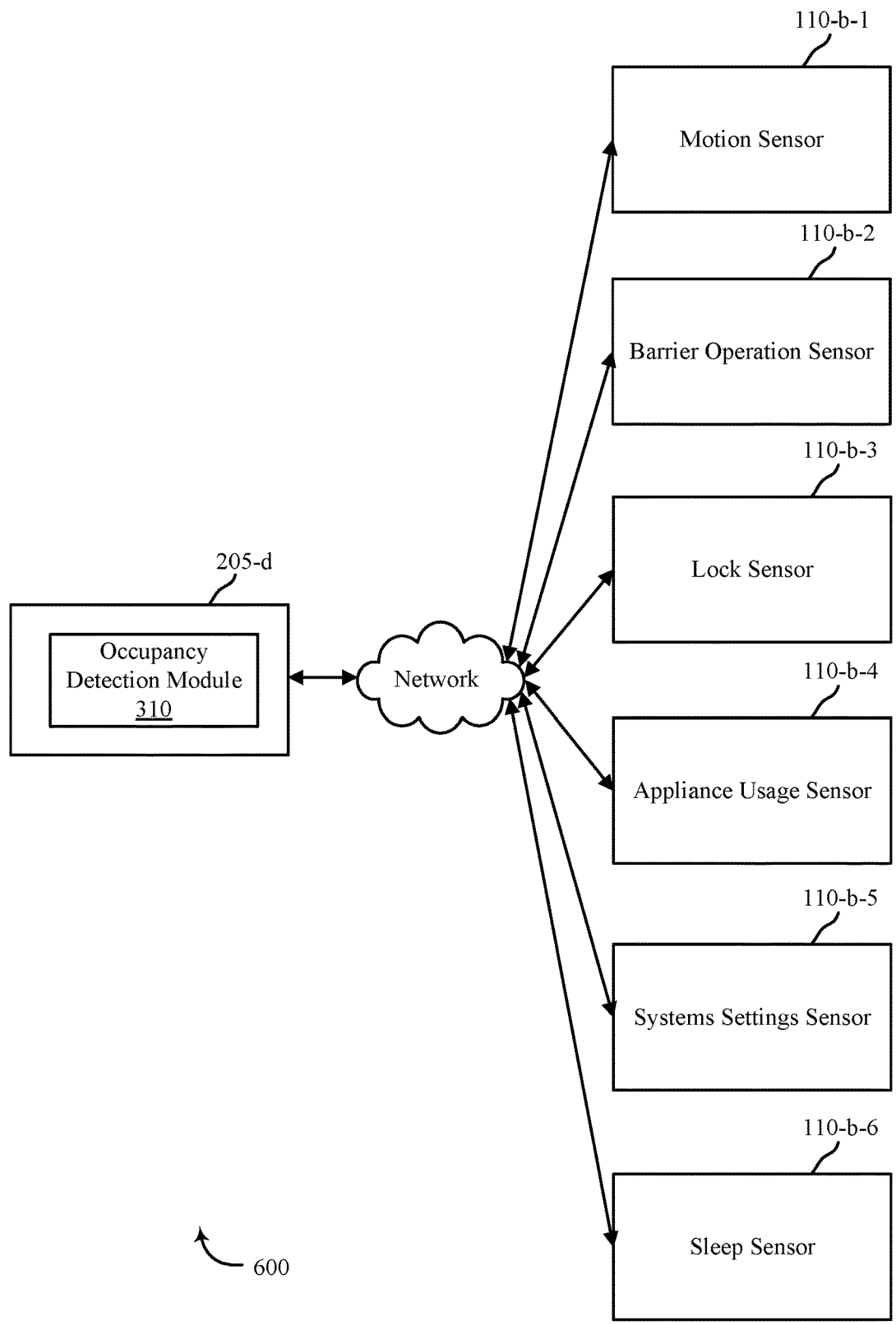
FIG. 6 shows another block diagram of an apparatus relating to a security and/or an automation system with water leak detection capability, in accordance with various aspects of this disclosure.

FIGS. 5 and 6 show block diagrams of apparatuses relating to a security and/or an automation system with water leak detection capability. FIG. 5 shows a device 205-*c* having a water usage module 305. The various inputs received by water usage module 305 as part of determining total water usage for the home and/or specific water usage and/or operation of water use sources in the home may be delivered via a network. Some example inputs for the information received by water usage module 305 include a total water usage sensor, an appliance water usage sensor, an audio sensor, and a character recognition sensor. Each of the sensors shown in FIG. 5 may provide data that is relevant to operation of water usage module 305.

In one example, total water usage sensor 110-*a*-1 provides sensor data associated with a pressure drop (e.g., via a pressure sensing device), a water metering device positioned in the main line of the water main of the home, or data from a utility company's water metering device positioned in the water main. The appliance water usage sensor 110-*a*-2 may be associated with one or more appliances in the home as part of determining general or specific water usage by that particular appliance. The audio sensor 110-*a*-3 may provide audio feedback of an actual water drip. The audio sensor 110-*a*-3 may be part of an existing sound system of a home security and/or automation system. For example, the audio sensor may be part of a microphone and/or speaker system in the home. In another example, audio sensor 110-*a*-3 may be located at specific areas of the home where water leaks may be most likely. In yet another example, the audio sensors are associated with the water main and/or a water metering device at the water main, wherein the audio data from the audio sensor generally indicates water being drawn at some water usage source in the home. The character recognition sensor 110-*a*-4 may be associated with a camera, scanner or the like that reads a meter such as the utility company's water metering device as part of determining total water usage.

FIG. 6 shows a device 205-*d* that may operate an occupancy module 310. The occupancy module 310 may be part of a leak detection module 215 as described above. The occupancy module 310 may receive input from a number of sources, some examples of which are shown in FIG. 6. FIG. 6 shows several data sources 110-*b* including, for example, a motion sensor, a barrier operation sensor, a lock sensor, an appliance usage sensor, a systems settings sensor, and a sleep sensor. Any one of the sensors shown in FIG. 6, individually or in combination, may be used to provide data utilized by occupancy module 310 to determine occupancy of the home. The motion sensor 110-*b*-1 may operate to determine actual movement of persons in the home, such as in specific rooms or entry points of the home. The barrier operation sensor 110-*b*-2 may provide feedback concerning operation of a barrier such as a door or window of the home. The lock sensor 110-*b*-3 may provide information about a locked state of one or more locks of the home (e.g., an exterior door or window of the home). The appliance usage sensor 110-*b*-4 may determine operation of one or more appliances such as an oven, a television, a ceiling fan, an HVAC system, or the like. The systems setting sensor 110-*b*-5 may be associated with manual adjustments to systems such as an HVAC system, a humidifier, a security and/or automation system, or the like. The sleep sensor 110-*b*-6 may determine if a person is in bed, is physically asleep, or the like. The sleep sensor may be actuated at least in part based on a user input such as a spoken or written command associated with going into a sleep state and/or putting a system into a sleep state. The sleep sensor may cooperate with other sensors and/or information such as time of day, movement in the home determined by the motion sensor, temperature settings of an HVAC system, a door lock status, and the like as part of helping determine whether one or more of the users is asleep.

Figure 7:
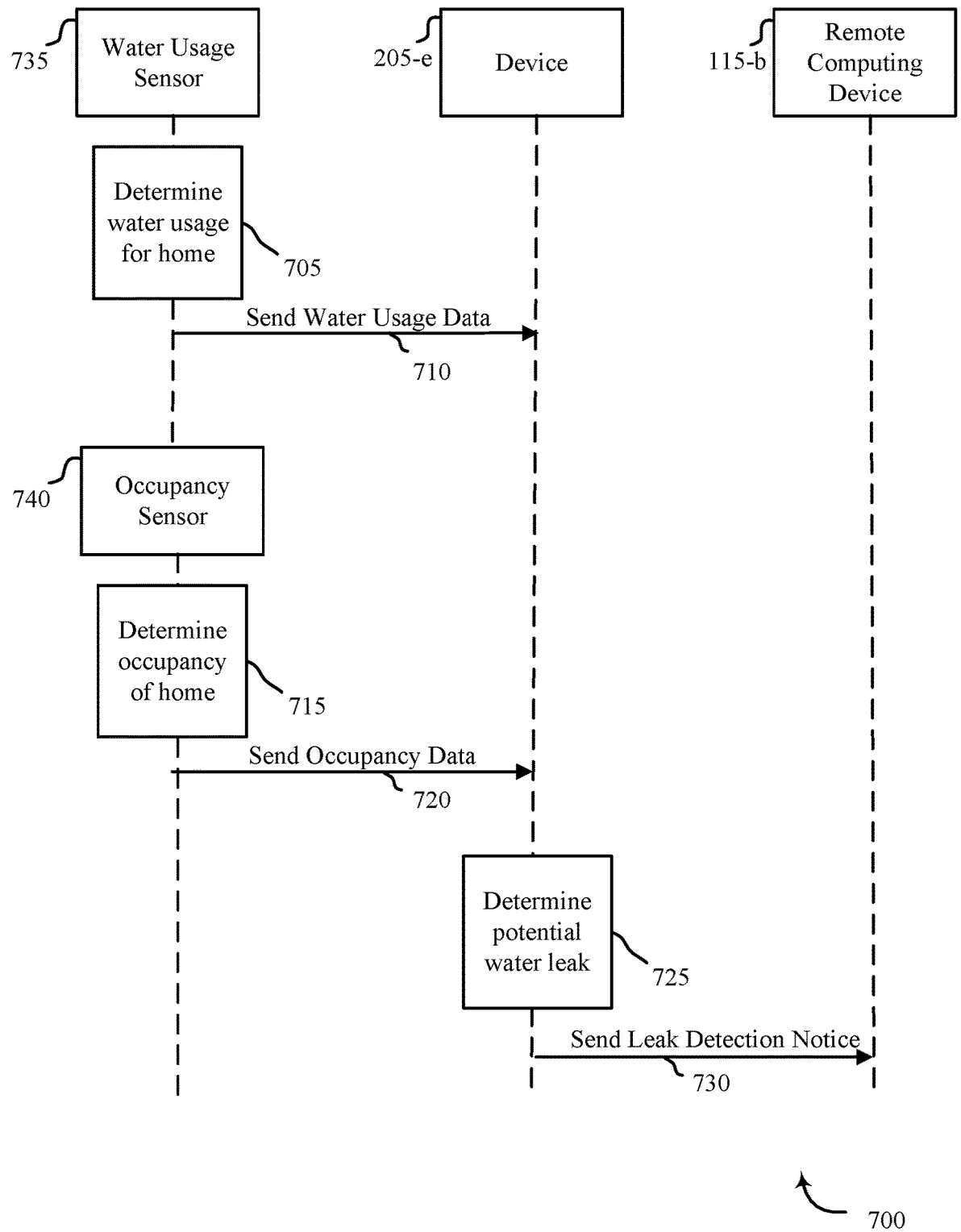
FIG. 7 shows a block diagram of an apparatus relating to a security and/or an automation system with water leak detection capability, in accordance with various aspects of this disclosure.

FIG. 7 shows a block diagram of an apparatus relating to a security and/or automation system, particularly associated with a water leak detection system. The water usage sensor 735 determines water usage for the home in block 705. The water usage sensor 735 may include at least one of the sensors 110-*a* shown in FIG. 5. The water usage sensor 735 sends water usage data 710 to device 205-*e*. The water usage may include total water usage for the home. The occupancy sensor 740 determines occupancy of the home in block 715 and sends occupancy data in a step 720 to device 205-*e*. The occupancy sensor 740 may include one or more of the sensors 110-*b* shown in FIG. 6. The device 205-*e* determines potential water leaks at block 725 and sends leak detection notices in a step 730 to, for example, a remote computing device 115-*b*. A remote computing device 115-*b* may be a handheld mobile device carried by one or more users of the home. In another example, the remote computing device 115-*b* may be a third party such as, for example, an operator at a central station of a security and/or automation system.

The leak detection notice 730 may include various messages and/or information. In one example, the leak detection notice includes a probability of a water leak. In another example, the leak detection notice 730 includes a potential source of the leak and/or location for the leak (e.g., a sprinkler system versus an appliance such as a dishwasher, a water main, a toilet, a faucet, or the like.) The block diagram of FIG. 7 may include other types of inputs received by device 205-*e*. In at least one example, device 205-*e* is a control panel of a security and/or automation system. The device 205-*e* may perform a wide variety of functions, only one of which is determining potential water leaks. In other examples, the device 205-*e* is bypassed. For example, the water usage data 710 and occupancy data 720 may be delivered directly to remote computing device 115-*b*, which may perform the step of determining a potential water leak. In other examples, the water usage data 710 and occupancy data 720 are sent to remote computing device 115-*b* or may be rerouted to other locations and/or devices such as, for example, device 205-*e*, which then determines potential water leaks. The data delivered via steps 710, 720 may be sent wirelessly on a continuous and/or periodic basis.

Figure 8:
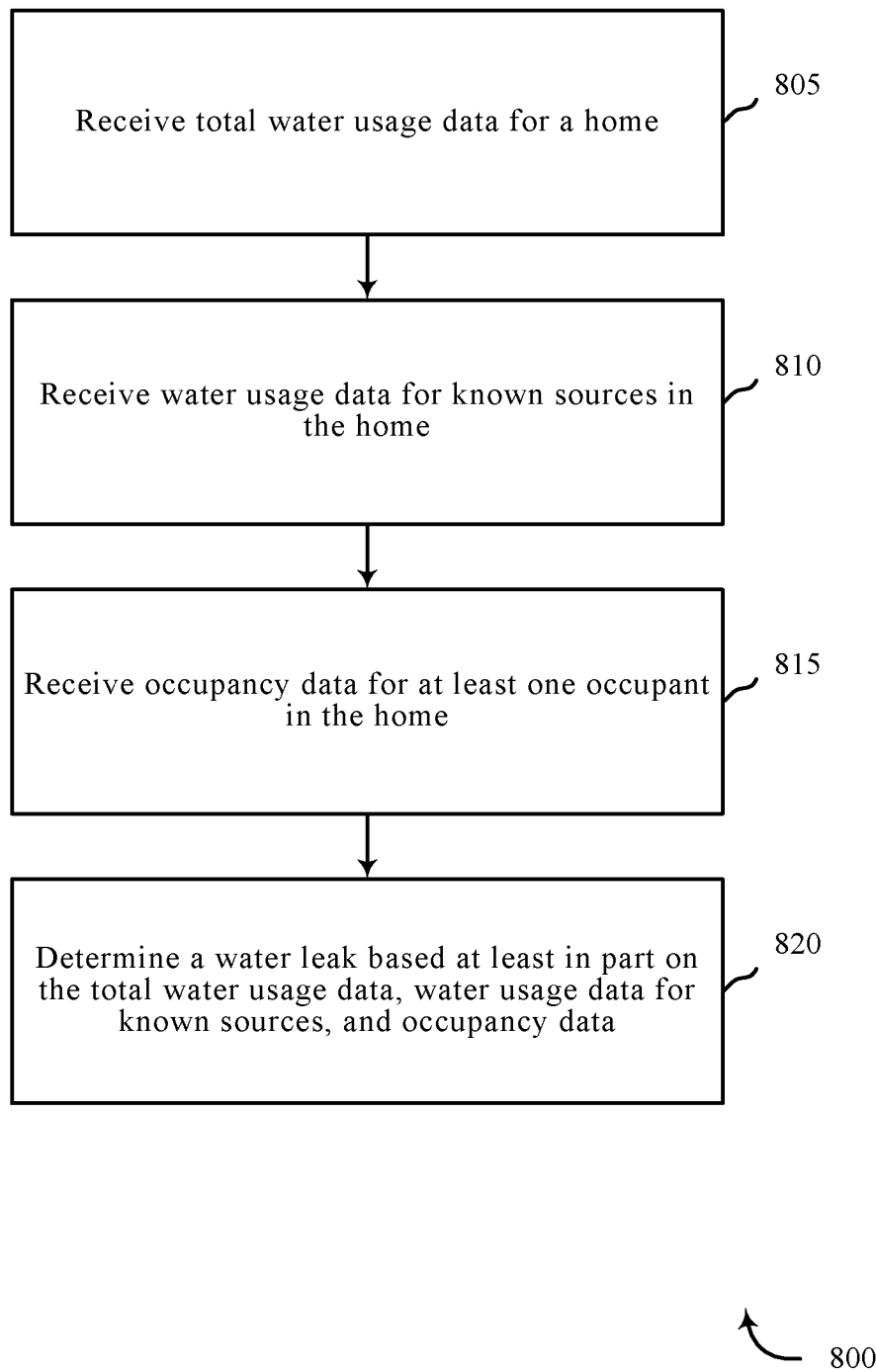
FIG. 8 is a flow chart illustrating an example of a method relating to a security and/or an automation system with water leak detection capability, in accordance with various aspects of this disclosure.

FIG. 8 is a flow chart illustrating an example of a method 800 for detecting water leaks in accordance with various aspects of the present disclosure. For clarity, the method 800 is described below with reference to aspects of one or more of the devices 205 described with reference to FIGS. 2-6, and/or aspects of one or more of the leak detection modules 215 described with reference to one or more of FIGS. 2-6. In some examples, a control panel and/or backend server may execute one or more sets of codes to control the functional elements of the control panel and/or backend server to perform the functions described below. Additionally or alternatively, the control panel and/or backend server, or one or more sensor devices may perform one or more of the functions described below using special-purpose hardware.

At block 805, the method 800 may include receiving total water usage data for a home. Block 810 includes receiving water usage data for known sources in the home. Block 815 includes receiving occupancy data for at least one occupant in the home. Block 820 includes determining a water leak based at least in part on the total water usage data, the water usage data for known sources and the occupancy data.

The operation(s) at block 805 may be performed using the device 205 and/or the leak detection module 215 described with reference to one or more of FIGS. 2-6.

Thus, the method 800 may provide for water leak detection and may be carried out at least in part using automation/security systems. It should be noted that the method 800 is just one implementation and that the operations of the method 800 may be rearranged or otherwise modified such that other implementations are possible.

Figure 9:
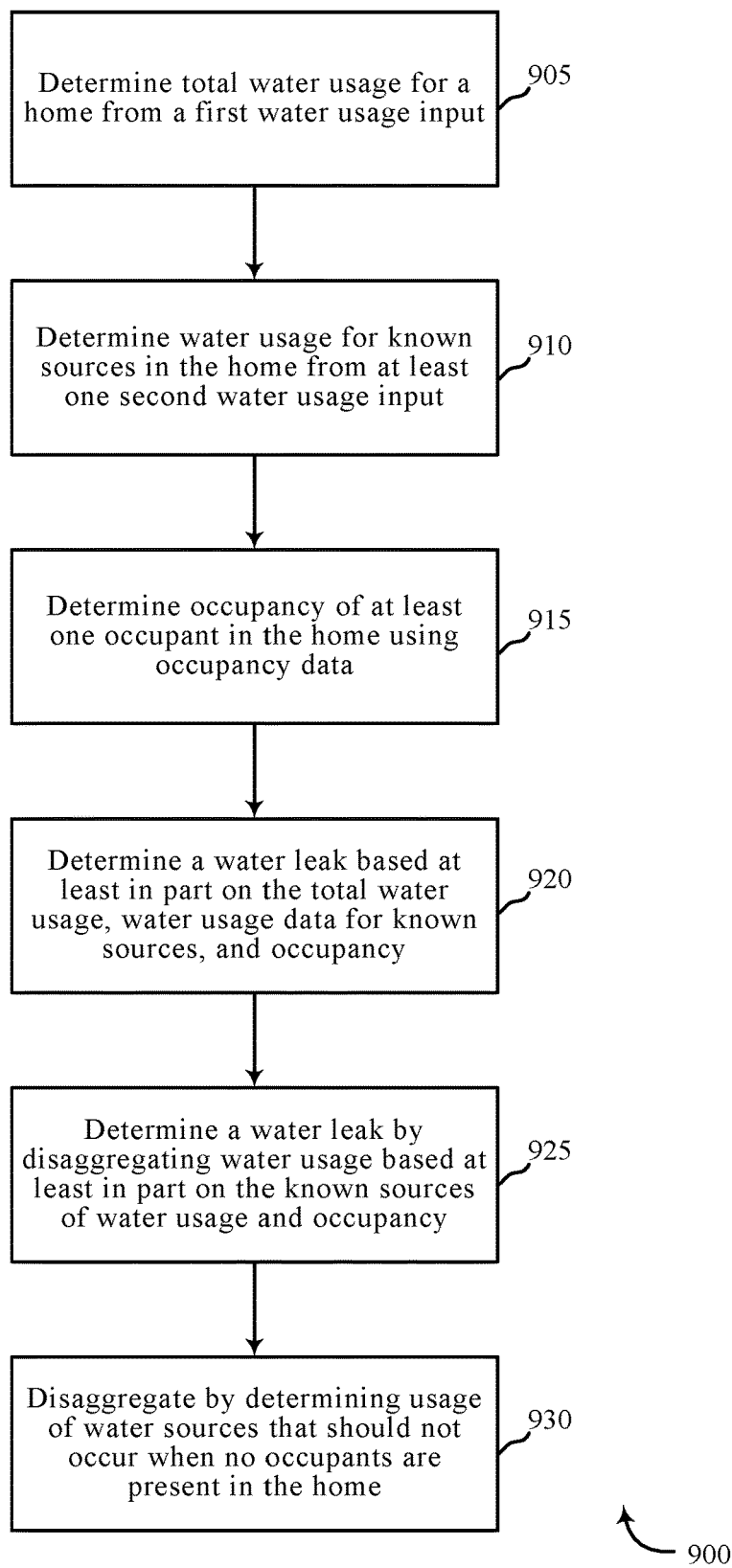
FIG. 9 is a flow chart illustrating an example of a method relating to a security and/or an automation system with water leak detection capability, in accordance with various aspects of this disclosure.

FIG. 9 is a flow chart illustrating an example of a method 900 for detecting water leaks in accordance with various aspects of the present disclosure. For clarity, the method 900 is described below with reference to aspects of one or more of the devices 205 described with reference to FIGS. 2-6, and/or aspects of one or more of the leak detection modules 215 described with reference to one or more of FIGS. 2-6. In some examples, a control panel and/or backend server may execute one or more sets of codes to control the functional elements of the control panel and/or backend server to perform the functions described below. Additionally or alternatively, the control panel and/or backend server, or one or more sensor devices may perform one or more of the functions described below using special-purpose hardware.

At block 905, the method 900 may include determining total water usage for a home from a first water usage input. Block 910 includes determining water usage for known sources in the home from at least one second water usage input. Block 915 includes determining occupancy of at least one occupant in the home using occupancy data. Block 920 includes determining a water leak based at least in part on a total water usage, water usage data for known sources, and occupancy. Block 925 includes determining a water leak by disaggregating water usage based at least in part on the known sources of water usage and occupancy. Block 930 includes disaggregating by determining usage of water sources that should not occur when no occupants are present in the home.

The operation(s) at block 905 may be performed using the device 205 and/or the leak detection module 215 described with reference to one or more of FIGS. 2-6.

Thus, the method 900 may provide for water leak detection and may be carried out at least in part using automation/security systems. It should be noted that the method 900 is just one implementation and that the operations of the method 900 may be rearranged or otherwise modified such that other implementations are possible.

In some examples, aspects from two or more of the methods 800, 900 may be combined and/or separated. It should be noted that the methods 800, 900, etc. are just example implementations, and that the operations of the methods 800, 900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for detecting water leaks using a security and/or automation system, comprising:
   determining, by a device of the security and/or automation system, an occupancy of a home;
   determining, by the device of the security and/or automation system, a source of water usage for the home based at least in part on determining the occupancy of the home;
   determining, by the device of the security and/or automation system, a total water usage for the home based at least in part on determining the source of the water usage for the home;
   determining, by the device of the security and/or automation system, a presence of a water leak in the home based at least in part on determining the occupancy, the source of the water usage, and the total water usage;
   generating, by the device of the security and/or automation system, a notification signal of the presence of the water leak based at least in part on determining the presence of the water leak; and
   transmitting, by the device of the security and/or automation system, the notification signal of the presence of the water leak based at least in part on generating the notification signal.

2. The method of claim 1, further comprising:
   determining whether a user of the home is at the home, in a sleep state at the home, involved in an activity at the home, or a combination thereof.

3. The method of claim 2, further comprising:
   determining whether the source of the water usage for the home is expected to use water based at least in part on determining whether the user is at the home, in the sleep state at the home, involved in the activity at the home, or a combination thereof.

4. The method of claim 1, further comprising:
   determining an amount of water used by the source of the water usage for the home, wherein determining the total water usage for the home is based at least in part on determining the amount of water.

5. The method of claim 4, further comprising:
   determining a period of time associated with the amount of water used by the source of the water usage for the home, wherein determining the total water usage for the home is based at least in part on determining the period of time.

6. The method of claim 1, further comprising:
   determining an operation state of the source of the water usage when a user of the home is at the home, exits the home, is in a sleep state at the home, or a combination thereof, wherein determining the total water usage for the home is based at least in part on determining the operation state of the source.

7. The method of claim 1, wherein determining the occupancy of the home further comprises:
   determining a time when a user enters the home, exits the home, or both.

8. The method of claim 1, further comprising:
   limiting a use of water in the home; and
   subtracting an amount of water from the total water usage based at least in part on limiting the use of water in the home.

9. An apparatus for security and/or automation systems, comprising:
a processor;
memory in electronic communication with the processor; and
instructions stored in the memory, the instructions being executable by the processor to:
determine, by a device of the security and/or automation system, an occupancy of a home;
determine, by the device of the security and/or automation system, a source of water usage for the home based at least in part on determining the occupancy of the home;
determine, by the device of the security and/or automation system, a total water usage for the home based at least in part on determining the source of the water usage for the home;
determine, by the device of the security and/or automation system, a presence of a water leak in the home based at least in part on determining the occupancy, the source of the water usage, and the total water usage;
generate, by the device of the security and/or automation system, a notification signal of the presence of the water leak based at least in part on determining the presence of the water leak; and
transmit, by the device of the security and/or automation system, the notification signal of the presence of the water leak based at least in part on generating the notification signal.

10. The apparatus of claim 9, wherein the instructions are further executable by the processor to:
determine whether a user of the home is at the home, in a sleep state at the home, involved in an activity at the home, or a combination thereof; and
determine whether the source of the water usage for the home is expected to use water based at least in part on determining whether the user is at the home, in the sleep state at the home, involved in the activity at the home, or a combination thereof.

11. The apparatus of claim 9, wherein the instructions are further executable by the processor to:
determine an amount of water used by the source of the water usage for the home; and
determine a period of time associated with the amount of water used by the source of the water usage for the home, wherein determining the total water usage for the home is based at least in part on determining the amount of water and determining the period of time.

12. The apparatus of claim 9, wherein the instructions are further executable by the processor to:
determine an operation state of the source of the water usage when a user of the home is at the home, exits the home, is in a sleep state at the home, or a combination thereof, wherein determining the total water usage for the home is based at least in part on determining the operation state of the source.

13. The apparatus of claim 9, wherein the instructions are further executable by the processor to:
determine a time when a user enters the home, exits the home, or both, wherein determining the occupancy of the home is based at least in part on determining the time when a user enters the home, exits the home, or both.

14. The apparatus of claim 9, wherein the instructions are further executable by the processor to:
limit a use of water in the home; and
subtract an amount of water from the total water usage based at least in part on limiting the use of water in the home.

15. A non-transitory computer-readable medium storing computer-executable code for security and/or automation systems, the code executable by a processor to:
determine, by a device of the security and/or automation system, an occupancy of a home;
determine, by the device of the security and/or automation system, a source of water usage for the home based at least in part on determining the occupancy of the home;
determine, by the device of the security and/or automation system, a total water usage for the home based at least in part on determining the source of the water usage for the home;
determine, by the device of the security and/or automation system, a presence of a water leak in the home based at least in part on determining the occupancy, the source of the water usage, and the total water usage;
generate, by the device of the security and/or automation system, a notification signal of the presence of the water leak based at least in part on determining the presence of the water leak; and
transmit, by the device of the security and/or automation system, the notification signal of the presence of the water leak based at least in part on generating the notification signal.

16. The non-transitory computer-readable medium according to claim 5, the code executable by the processor to:
determine whether a user of the home is at the home, in a sleep state at the home, involved in an activity at the home, or a combination thereof; and
determine whether the source of the water usage for the home is expected to use water based at least in part on determining whether the user is at the home, in the sleep state at the home, involved in the activity at the home, or a combination thereof.

17. The non-transitory computer-readable medium according to claim 15, the code executable by the processor to:
determine an amount of water used by the source of the water usage for the home; and
determine a period of time associated with the amount of water used by the source of the water usage for the home, wherein determining the total water usage for the home is based at least in part on determining the amount of water and determining the period of time.

18. The non-transitory computer-readable medium according to claim 15, the code executable by the processor to:
determine an operation state of the source of the water usage when a user of the home is at the home, exits the home, is in a sleep state at the home, or a combination thereof, wherein determining the total water usage for the home is based at least in part on determining the operation state of the source.

19. The non-transitory computer-readable medium according to claim 15, the code executable by the processor to:
determine a time when a user enters the home, exits the home, or both, wherein determining the occupancy of the home is based at least in part on determining the time when a user enters the home, exits the home, or both.

20. The non-transitory computer-readable medium according to claim 15, the code executable by the processor to:
   limit a use of water in the home; and
   subtract an amount of water from the total water usage based at least in part on limiting the use of water in the home.

\* \* \* \* \*